US009660297B2

(12) United States Patent
Carlson

(10) Patent No.: US 9,660,297 B2
(45) Date of Patent: *May 23, 2017

(54) METHODS OF PRODUCING BATTERIES UTILIZING ANODE COATINGS DIRECTLY ON NANOPOROUS SEPARATORS

(71) Applicant: Optodot Corporation, Woburn, MA (US)

(72) Inventor: Steven A. Carlson, Cambridge, MA (US)

(73) Assignee: Optodot Corporation, Woburn, MA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/605,349

(22) Filed: Jan. 26, 2015

(65) Prior Publication Data

US 2015/0140205 A1    May 21, 2015

Related U.S. Application Data

(60) Division of application No. 13/302,782, filed on Nov. 22, 2011, now Pat. No. 8,962,182, which is a
(Continued)

(51) Int. Cl.
*H01M 4/04* (2006.01)
*H01M 10/0585* (2010.01)
(Continued)

(52) U.S. Cl.
CPC ....... *H01M 10/0585* (2013.01); *H01M 2/145* (2013.01); *H01M 2/166* (2013.01);
(Continued)

(58) Field of Classification Search
CPC ............. H01M 2/166; H01M 10/0585; H01M 10/052; H01M 10/4235; H01M 4/0421;
(Continued)

(56) References Cited

U.S. PATENT DOCUMENTS 3,625,771 A    12/1971    Arrance et al.
3,647,554 A    3/1972    Arrance et al.
(Continued)

FOREIGN PATENT DOCUMENTS

CA    2605874    1/2007
EP    0143562 A1    6/1985
(Continued)

OTHER PUBLICATIONS

U.S. Appl. No. 13/302,782, filed Nov. 22, 2011, Pending.

*Primary Examiner* — Muhammad Siddiquee
(74) *Attorney, Agent, or Firm* — Amster, Rothstein & Ebenstein, LLP

(57) ABSTRACT

Provided are methods of preparing a separator/anode assembly for use in an electric current producing cell, wherein the assembly comprises an anode current collector layer interposed between a first anode layer and a second anode layer and a porous separator layer on the side of the first anode layer opposite to the anode current collector layer, wherein the first anode layer is coated directly on the separator layer.

20 Claims, 1 Drawing Sheet

NOT TO SCALE

Related U.S. Application Data continuation-in-part of application No. PCT/US2010/001536, filed on May 26, 2010, and a continuation-in-part of application No. PCT/US2010/001537, filed on May 26, 2010, and a continuation-in-part of application No. PCT/US2010/001539, filed on May 26, 2010, and a continuation-in-part of application No. PCT/US2010/001535, filed on May 26, 2010.

(60) Provisional application No. 61/217,132, filed on May 26, 2009.

(51) Int. Cl.
| | | |
|---|---|---|
| H01M 2/16 | (2006.01) | |
| H01M 4/64 | (2006.01) | |
| H01M 10/052 | (2010.01) | |
| H01M 10/42 | (2006.01) | |
| H01M 2/14 | (2006.01) | |
| H01M 6/16 | (2006.01) | |
| H01M 4/136 | (2010.01) | |

(52) U.S. Cl.
CPC ....... H01M 4/0402 (2013.01); H01M 4/0421 (2013.01); H01M 4/64 (2013.01); H01M 10/052 (2013.01); H01M 10/4235 (2013.01); H01M 4/136 (2013.01); H01M 6/16 (2013.01); Y02P 70/54 (2015.11); Y02T 10/7011 (2013.01); Y10T 29/4911 (2015.01); Y10T 29/49115 (2015.01)

(58) Field of Classification Search
CPC ...... H01M 2/145; H01M 4/0402; H01M 4/64; H01M 6/16; H01M 4/136; Y02T 10/7011; Y02P 70/54; Y10T 29/4911; Y10T 29/49115; Y02E 60/122
See application file for complete search history.

(56) References Cited

U.S. PATENT DOCUMENTS

| | | | |
|---|---|---|---|
| 5,162,175 | A | 11/1992 | Visco et al. |
| 5,194,341 | A | 3/1993 | Bagley et al. |
| 5,314,765 | A | 5/1994 | Bates |
| 5,326,391 | A | 7/1994 | Anderson et al. |
| 5,350,645 | A | 9/1994 | Lake et al. |
| 5,415,954 | A | 5/1995 | Gauthier et al. |
| 5,418,091 | A | 5/1995 | Gozdz et al. |
| 5,439,760 | A | 8/1995 | Howard et al. |
| 5,549,717 | A | 8/1996 | Takeuchi et al. |
| 5,569,520 | A | 10/1996 | Bates |
| 5,597,659 | A | 1/1997 | Morigaki et al. |
| 5,691,005 | A | 11/1997 | Morigaki et al. |
| 5,731,104 | A | 3/1998 | Ventura et al. |
| 5,778,515 | A | 7/1998 | Menon |
| 5,824,434 | A | 10/1998 | Kawakami et al. |
| 5,840,087 | A | 11/1998 | Gozdz et al. |
| 5,882,721 | A | 3/1999 | Delnick |
| 5,894,656 | A * | 4/1999 | Menon ............... H01M 2/1673 29/623.1 |
| 5,948,464 | A | 9/1999 | Delnick |
| 6,148,503 | A | 11/2000 | Delnick et al. |
| 6,153,337 | A | 11/2000 | Carlson et al. |
| 6,162,563 | A | 12/2000 | Miura et al. |
| 6,183,901 | B1 | 2/2001 | Ying et al. |
| 6,194,098 | B1 | 2/2001 | Ying et al. |
| 6,268,087 | B1 | 7/2001 | Kim et al. |
| 6,277,514 | B1 | 8/2001 | Ying et al. |
| 6,287,720 | B1 | 9/2001 | Yamashita et al. |
| 6,306,545 | B1 | 10/2001 | Carlson et al. |
| 6,328,770 | B1 | 12/2001 | Gozdz |
| 6,344,293 | B1 | 2/2002 | Geronov |
| 6,410,182 | B1 | 6/2002 | Ying et al. |
| 6,423,444 | B1 | 7/2002 | Ying et al. |
| 6,451,484 | B1 | 9/2002 | Han et al. |
| 6,488,721 | B1 * | 12/2002 | Carlson ............... H01M 2/1673 29/623.5 |
| 6,497,780 | B1 | 12/2002 | Carlson |
| 6,723,467 | B2 | 4/2004 | Yoshida et al. |
| 6,811,928 | B2 | 11/2004 | Aihara et al. |
| 7,014,948 | B2 | 3/2006 | Lee et al. |
| 7,066,971 | B1 | 6/2006 | Carlson |
| 7,070,632 | B1 | 7/2006 | Visco et al. |
| 7,081,142 | B1 | 7/2006 | Carlson |
| 7,115,339 | B2 | 10/2006 | Nakajima et al. |
| 7,160,603 | B2 | 1/2007 | Carlson |
| 7,378,185 | B2 | 5/2008 | Fujikawa et al. |
| 7,396,612 | B2 | 7/2008 | Ohata et al. |
| 7,402,184 | B2 | 7/2008 | Ikuta et al. |
| 7,419,743 | B2 | 9/2008 | Fujikawa et al. |
| 7,422,825 | B2 | 9/2008 | Inoue et al. |
| 7,470,488 | B2 | 12/2008 | Lee et al. |
| 7,560,193 | B2 | 7/2009 | Ikuta et al. |
| 7,575,606 | B2 | 8/2009 | Fukumoto et al. |
| 7,595,130 | B2 | 9/2009 | Kawabata et al. |
| 7,638,230 | B2 | 12/2009 | Fujita et al. |
| 7,638,241 | B2 | 12/2009 | Lee et al. |
| 7,662,517 | B2 | 2/2010 | Lee et al. |
| 7,674,559 | B2 | 3/2010 | Min et al. |
| 7,682,740 | B2 | 3/2010 | Yong et al. |
| 7,682,751 | B2 | 3/2010 | Kato et al. |
| 7,687,202 | B2 | 3/2010 | Nishino et al. |
| 7,695,870 | B2 | 4/2010 | Park et al. |
| 7,704,641 | B2 | 4/2010 | Yong et al. |
| 7,709,152 | B2 | 5/2010 | Kim et al. |
| 7,709,153 | B2 | 5/2010 | Lee et al. |
| 7,745,042 | B2 | 6/2010 | Fujino et al. |
| 7,745,050 | B2 | 6/2010 | Kajita et al. |
| 7,754,375 | B2 | 7/2010 | Fujikawa et al. |
| 7,754,377 | B2 | 7/2010 | Ohata et al. |
| 7,758,998 | B2 | 7/2010 | Ohata et al. |
| 7,759,004 | B2 | 7/2010 | Ikuta et al. |
| 7,811,700 | B2 | 10/2010 | Hennige et al. |
| 7,816,038 | B2 | 10/2010 | Ohata et al. |
| 7,829,242 | B2 | 11/2010 | Hörpel et al. |
| 8,962,182 | B2 | 2/2015 | Carlson |
| 9,065,120 | B2 | 6/2015 | Carlson |
| 2001/0000485 | A1 | 4/2001 | Ying et al. |
| 2001/0038938 | A1 | 11/2001 | Takahashi et al. |
| 2001/0053475 | A1 | 12/2001 | Ying et al. |
| 2002/0092155 | A1 | 7/2002 | Carlson et al. |
| 2002/0141029 | A1 | 10/2002 | Carlson et al. |
| 2003/0035995 | A1 | 2/2003 | Ohsaki et al. |
| 2003/0118910 | A1 | 6/2003 | Carlson |
| 2003/0171784 | A1 | 9/2003 | Dodd et al. |
| 2004/0038090 | A1 | 2/2004 | Faris |
| 2004/0043295 | A1 | 3/2004 | Rodriguez et al. |
| 2004/0185335 | A1 | 9/2004 | Carlson |
| 2004/0188880 | A1 | 9/2004 | Bauer et al. |
| 2004/0241540 | A1 * | 12/2004 | Tsutsumi ............... H01M 2/16 429/122 |
| 2005/0221190 | A1 | 10/2005 | Sudano et al. |
| 2005/0266305 | A1 | 12/2005 | Ohata et al. |
| 2006/0008698 | A1 | 1/2006 | Kim et al. |
| 2006/0127753 | A1 | 6/2006 | Nakashima et al. |
| 2006/0172158 | A1 | 8/2006 | Min et al. |
| 2006/0172185 | A1 | 8/2006 | Mimura |
| 2006/0177732 | A1 | 8/2006 | Visco et al. |
| 2006/0222954 | A1 | 10/2006 | Skotheim et al. |
| 2006/0275661 | A1 | 12/2006 | Kim et al. |
| 2007/0065714 | A1 | 3/2007 | Hambitzer et al. |
| 2007/0108120 | A1 | 5/2007 | Carlson |
| 2007/0110990 | A1 | 5/2007 | Carlson |
| 2007/0111070 | A1 | 5/2007 | Carlson |
| 2007/0178384 | A1 * | 8/2007 | Kajita ............... H01M 2/1653 429/251 |
| 2007/0184350 | A1 | 8/2007 | Kim et al. |
| 2007/0189959 | A1 | 8/2007 | Carlson et al. |
| 2007/0190427 | A1 | 8/2007 | Carlson et al. |
| 2007/0204458 | A1 | 9/2007 | Fujita et al. |
| 2007/0243460 | A1 | 10/2007 | Carlson et al. |
| 2007/0269714 | A1 | 11/2007 | Watanabe et al. |

(56) References Cited

U.S. PATENT DOCUMENTS

| | | |
|---|---|---|
| 2008/0032197 A1 | 2/2008 | Horpel et al. |
| 2008/0166202 A1 | 7/2008 | Dunlap et al. |
| 2008/0182174 A1 | 7/2008 | Carlson et al. |
| 2009/0017380 A1* | 1/2009 | Honda .................. H01M 2/16 429/218.1 |
| 2009/0087728 A1 | 4/2009 | Less et al. |
| 2009/0202912 A1 | 8/2009 | Baba et al. |
| 2009/0246636 A1 | 10/2009 | Chiang et al. |
| 2010/0003592 A1 | 1/2010 | Baba |
| 2010/0261065 A1 | 10/2010 | Babinec et al. |
| 2011/0097623 A1 | 4/2011 | Marinis, Jr. et al. |
| 2011/0281171 A1 | 11/2011 | Yong et al. |
| 2012/0064399 A1 | 3/2012 | Carlson |
| 2012/0064404 A1 | 3/2012 | Carlson |

FOREIGN PATENT DOCUMENTS

| | | |
|---|---|---|
| EP | 0523840 B1 | 1/1993 |
| EP | 0600718 B1 | 6/1994 |
| EP | 0814520 A2 | 12/1997 |
| EP | 0836238 B1 | 4/1998 |
| EP | 0848435 B1 | 6/1998 |
| EP | 0875950 A2 | 11/1998 |
| EP | 0892449 A1 | 1/1999 |
| EP | 1156544 | 11/2011 |
| JP | H06140077 | 5/1994 |
| JP | H0927343 | 1/1997 |
| JP | H09027343 A | 1/1997 |
| JP | H10214639 | 8/1998 |
| JP | 2011233144 A | 8/1999 |
| JP | 2000323129 A | 11/2000 |
| JP | 2002042882 | 2/2002 |
| JP | 2003223926 | 8/2003 |
| JP | 2005235695 | 2/2005 |
| JP | 2005022674 A1 | 3/2005 |
| JP | 2007258160 | 10/2007 |
| JP | 2008041404 | 2/2008 |
| JP | 2008123988 | 5/2008 |
| WO | 9102385 A1 | 2/1991 |
| WO | 9103080 A1 | 3/1991 |
| WO | 9931751 | 6/1999 |
| WO | 9933125 A1 | 7/1999 |
| WO | 9957770 A1 | 11/1999 |
| WO | 0076011 A | 12/2000 |
| WO | 0139293 | 5/2001 |
| WO | 2009014388 | 1/2009 |
| WO | 2009026467 A1 | 2/2009 |
| WO | 2010138176 | 12/2010 |
| WO | 2010138177 | 12/2010 |
| WO | 2010138179 | 12/2010 |
| WO | 2013146126 | 10/2013 |

* cited by examiner

NOT TO SCALE

NOT TO SCALE

METHODS OF PRODUCING BATTERIES UTILIZING ANODE COATINGS DIRECTLY ON NANOPOROUS SEPARATORS

RELATED APPLICATIONS

The present application is a divisional of U.S. patent application Ser. No. 13/302,782, filed Nov. 22, 2011, titled Batteries Utilizing Anode Coatings Directly on Nanoporous Separators that is a continuation-in-part of the following applications:

(a) PCT Application No. PCT/US2010/001536, filed May 26, 2010, which claims the benefit under 35 U.S.C. §119(e) of U.S. Provisional Patent Application No. 61/217,132, filed May 26, 2009;

(b) PCT Application No. PCT/US2010/001537, filed May 26, 2010, which claims the benefit under 35 U.S.C. §119(e) of U.S. Provisional Patent Application No. 61/217,132, filed May 26, 2009;

(c) PCT Application No. PCT/US2010/001539, filed May 26, 2010, which claims the benefit under 35 U.S.C. §119(e) of U.S. Provisional Patent Application No. 61/217,132, filed May 26, 2009; and (d) PCT Application No. PCT/US2010/001535, filed May 26, 2010, which claims the benefit under 35 U.S.C. §119(e) of U.S. Provisional Patent Application No. 61/217,132, filed May 26, 2009.

The entireties of each of the above-referenced patent applications are incorporated herein by reference.

FIELD OF THE INVENTION

The present invention relates generally to the field of batteries and other electric current producing cells. This invention pertains to lithium batteries that utilize nanoporous separators and to methods of preparing lithium batteries by taking advantage of the nanoporous structure of the separator to overlay the other layers of the battery in a desired configuration. More particularly, the present invention pertains to separator/anode assemblies for batteries where the anode layer is coated directly on a porous separator layer and to methods of preparing such separator/anode assemblies.

BACKGROUND OF THE INVENTION

Lithium batteries, including rechargeable or secondary lithium ion batteries, non-rechargeable or primary lithium batteries, and other types such as lithium-sulfur batteries, are typically made by interleaving a plastic separator, a conductive metal substrate with a cathode layer coated on both sides, another plastic separator, and another conductive metal substrate with an anode layer coated on both sides. To maintain the alignment of the strips of these materials and for other quality reasons, this interleaving is usually done on automatic equipment, which is complex and expensive. Also, in order to achieve sufficient mechanical strength and integrity, the separators and the metal substrates are relatively thick, such as 10 microns in thickness or more. For example, a typical thickness of the copper metal substrate for the anode coating layers is 10 microns, a typical thickness of the aluminum metal substrate for the cathode coating layers is 12 microns, and the plastic separators typically have thicknesses ranging from 12 to 20 microns. These thick separators and metal substrates are not electrochemically active and thus lower the volume of the electroactive material in the electrodes of the lithium batteries. This limits the energy density and power density of the lithium batteries.

Among the new applications for lithium batteries are high power batteries for hybrid, plug-in hybrid, and electric vehicles. In contrast to the cylindrical metal cells used in lithium batteries for portable computers and other applications, many of the lithium batteries for vehicles are of a flat or prismatic design. Also, the lithium batteries for vehicles need to be economical. Potential approaches to make higher energy and more economical lithium batteries for vehicles and other applications include greatly increasing the proportion or percentage of the volume of the electroactive material in each battery and reducing the complexity and expense of the automated equipment to fabricate the battery.

It would be advantageous if a lithium battery comprised separator and metal substrate layers that were much thinner than are currently used with either or both of its cathode and anode layers and thereby had a greater content of electroactive material. It would be particularly advantageous if this lithium battery could be fabricated on less complex and less expensive automated processing equipment than, for example, the winding equipment utilized for portable computer batteries, and furthermore was particularly adapted for making flat or prismatic batteries.

SUMMARY OF THE INVENTION

This invention pertains to lithium and other batteries and to separator/anode assemblies for lithium and other batteries that utilize nanoporous separators, particularly heat resistant separators with dimensional stability at temperatures at and above 200° C., and to methods of preparing lithium batteries and separator/anode assemblies, by taking advantage of the nanoporous structure of the separator layer to coat the other layers of the battery in a desired thickness and configuration directly on the porous separator layer.

One aspect of this invention pertains to a separator/anode assembly for use in an electric current producing cell, wherein the assembly comprises an anode current collector layer interposed between a first anode layer and a second anode layer and a porous separator layer on the side of the first anode layer opposite to the anode current collector layer, wherein the first anode layer is coated directly on the separator layer. In one embodiment of the separator/anode assembly, no separator layer is coated directly on the second anode layer. In one embodiment, the surface of the first anode layer adjacent to the top surface of the separator layer has a contour matching the contour of the top surface of the separator layer, and the contour of the top surface of the separator layer is the same as before the coating of the first anode layer directly on the separator layer.

In one embodiment of the separator/anode assemblies of this invention, the first anode layer comprises anode particles selected from the group consisting of electroactive particles and electrically conductive particles, and the anode particles are not present in the separator layer. In one embodiment, the separator layer comprises separator particles, and the separator particles are not present in the first anode layer. In one embodiment, the separator particles are selected from the group consisting of inorganic oxide particles, inorganic nitride particles, inorganic carbonate particles, inorganic sulfate particles, and polymer particles.

In one embodiment of the separator/anode assemblies of the present invention, the anode current collector layer of the assembly comprises a copper layer. In one embodiment, the thickness of the copper layer is less than 3 microns.

In one embodiment of the separator/anode assemblies of this invention, the separator layer comprises pores having an average pore diameter of less than 0.2 microns, and preferably less than 0.1 microns. In one embodiment, the separator layer has a thickness of less than 9 microns, and preferably less than 6 microns. In one embodiment, the separator comprises a porous layer comprising aluminum boehmite.

Still another aspect of this invention pertains to a separator/anode assembly for use in an electric current producing cell, wherein the separator/anode assembly comprises an anode layer and a porous separator layer on one side of the anode layer, and wherein the anode layer is coated directly on the separator layer. In one embodiment, the anode layer comprises lithium metal.

Another aspect of the present invention pertains to methods of making a separator/anode assembly for use in an electric current producing cell comprising the steps of (a) providing a porous separator layer; (b) coating a first anode layer directly on the separator layer; and (c) coating one or more anode current collector layers directly on the first anode layer to make the separator/anode assembly. In one embodiment, after step (c), there is a further step (d) of coating a second anode layer directly on the one or more anode current collector layers. In one embodiment, step (a) comprises coating a porous separator on a substrate. In one embodiment, the substrate is a release substrate, and, after step (c), there is a further step (d) of delaminating the substrate from the separator layer to form the separator/anode assembly. In one embodiment, after step (c) and prior to step (d), there is a further step of coating a second anode layer directly on the one or more anode current collector layers. In one embodiment, the substrate is a porous substrate. In one embodiment, the porous substrate is selected from the group consisting of porous polymer films and porous non-woven polymer fiber substrates.

In one embodiment of the methods of making separator/anode assemblies of this invention, the one or more anode current collector layers of step (c) comprises a metal layer and the thickness of the metal layer is less than 3 microns. In one embodiment, the separator layer comprises pores having an average pore diameter of less than 0.2 microns, and preferably less than 0.1 microns. In one embodiment, the separator layer has a thickness of less than 9 microns, and preferably less than 6 microns.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
FIG. 1 shows a cross-section view of a separator/anode assembly after one version of the steps to make a separator/anode assembly.

The separator/anode assemblies and methods of preparing separator/anode assemblies of the present invention provide a flexible and effective approach to separator/anode assemblies and to lithium and other batteries incorporating such separator/anode assemblies, to provide lithium and other batteries with higher energy and power densities and with lower manufacturing and capital equipment costs.

One aspect of this invention pertains to a separator/anode assembly for use in an electric current producing cell, wherein the assembly comprises an anode current collector layer interposed between a first anode layer and a second anode layer and a porous separator layer on the side of the first anode layer opposite to the anode current collector layer, wherein the first anode layer is coated directly on the separator layer. In one embodiment of the separator/anode assembly, no separator layer is coated directly on the second anode layer. In one embodiment, the surface of the first anode layer adjacent to the top surface of the separator layer has a contour matching the contour of the top surface of the separator layer, and the contour of the top surface of the separator layer is the same as before the coating of the first anode layer directly on the separator layer.

As used herein, the word "battery" pertains to both a single electric current producing cell and to multiple electric current producing cells combined in a casing or pack. As used herein, the term "lithium battery" refers to all types of lithium batteries known in the art, including, but not limited to, rechargeable or secondary lithium ion batteries, non-rechargeable or primary lithium batteries, and other types such as lithium-sulfur batteries.

As used herein, the term "current collector layer" refers to one or more current collection layers that are adjacent to an electrode layer. This includes, but is not limited to, a single conductive metal layer or substrate and a single conductive metal layer or substrate with an overlying conductive coating layer, such as a carbon black-based polymer coating layer. Examples of a conductive metal substrate as the current collector are a metal substrate comprising aluminum, which is typically used as the current collector and substrate for the positive electrode or cathode layer, and a metal substrate comprising copper, which is typically used as the current collector and substrate for the negative electrode or anode layer. The anode current collector layer may comprise an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the anode current collector layer.

As used herein, the term "electrode layer" refers to a layer of the cell that comprises electroactive material. When the electrode layer is where the lithium is present in the case of primary lithium batteries or, in the case of rechargeable lithium batteries, is formed during the charging of the battery and is oxidized to lithium ions during the discharging of the battery, the electrode layer is called the anode or negative electrode. The other electrode of opposite polarity is called the cathode or positive electrode. Any of the electroactive materials that are useful in lithium batteries may be utilized in the electrode layers of this invention. Examples include, but are not limited to, lithium cobalt oxide, lithium manganese oxide, lithium iron phosphate, and sulfur as electroactive materials in the cathode layers and lithium titanate, lithium metal, lithium-intercalated graphite, and lithium-intercalated carbon as electroactive materials in the anode layers.

As used herein, the word "electrolyte" refers to any of the electrolytes that are useful in lithium batteries. Suitable electrolytes include, but are not limited to, liquid electrolytes, gel polymer electrolytes, and solid polymer electrolytes. Suitable liquid electrolytes include, but are not limited to, $LiPF_6$ solutions in a mixture of organic solvents, such as, for example, a mixture of ethylene carbonate, propylene carbonate, and ethyl methyl carbonate.

Figure 2:
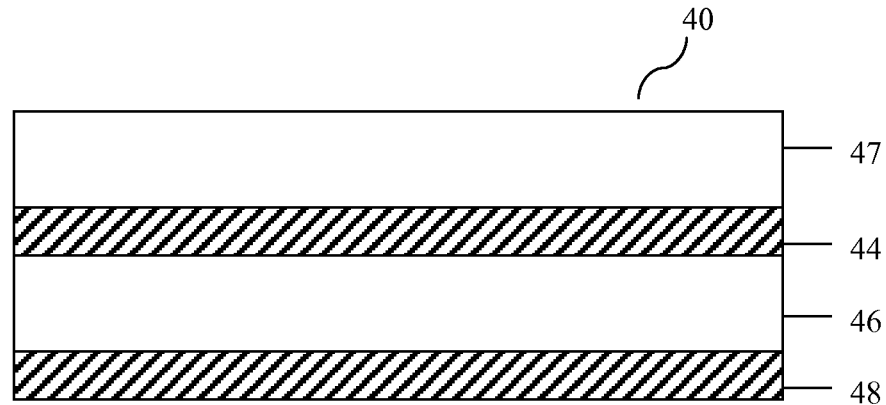
FIG. 2 shows a cross-section view of a separator/anode assembly after another version of the steps to make a separator/anode assembly.

FIG. 1 shows an example of a cross-section view (not to scale) of one version of a separator/anode assembly 30 of the present invention with first anode layer 36 interposed between anode current collector layer 34 and porous separator layer 38. FIG. 2 shows an example of a cross-section view (not to scale) of another version of a separator/anode assembly 40 of this invention with an anode current collector layer 44 interposed between a first anode layer 46 and a second anode layer 47 and with a porous separator layer 48 on the side of the first anode layer 46 opposite to the anode current collector layer 44.

In one embodiment of the separator/anode assemblies of the present invention, the first anode layer comprises anode particles selected from the group consisting of electroactive particles and electrically conductive particles, and the anode particles are not present in the separator layer. In one embodiment, the separator layer comprises separator particles, and the separator particles are not present in the first anode layer. In one embodiment, the separator particles are selected from the group consisting of inorganic oxide particles, inorganic nitride particles, inorganic carbonate particles, inorganic sulfate particles, and polymer particles.

In one embodiment of the separator/anode assemblies of this invention, the separator layer comprises pores with an average pore diameter of less than 0.2 microns, and preferably less than 0.1 microns. In one embodiment, the separator layer has a pore diameter of less than 0.2 microns, and preferably less than 0.1 microns. In one embodiment, the separator layer has a thickness of less than 9 microns, and preferably less than 6 microns. In one embodiment, the porous separator layer comprises a porous layer comprising a xerogel layer or xerogel membrane. In one embodiment, the porous separator layer comprises aluminum boehmite. In one embodiment, the separator layer is a heat resistant separator layer with dimensional stability at 200° C. and higher.

By the term "xerogel layer", as used herein, is meant a porous layer that was formed by a xerogel or sol gel process of drying a colloidal sol liquid to form a solid gel material. By the term "xerogel membrane", as used herein, is meant a membrane that comprises at least one layer comprising a xerogel layer where the pores of the xerogel layer are continuous from one side of the layer to the other side of the layer. Xerogel layers and membranes typically comprise inorganic oxide materials, such as aluminum oxides, aluminum boehmites, and zirconium oxides, as the sol gel materials. Examples of suitable xerogel membranes for the present invention include, but are not limited to, xerogel membranes described in U.S. Pat. Nos. 6,153,337 and 6,306,545 to Carlson et al. and U.S. Pat. Nos. 6,488,721 and 6,497,780 to Carlson.

Still another aspect of this invention pertains to a separator/anode assembly for use in an electric current producing cell, wherein the separator/anode assembly comprises an anode layer and a porous separator layer on one side of the anode layer, and wherein the anode layer is coated directly on the separator layer. In one embodiment, the anode layer comprises lithium metal. With some anode layers, such as, for example, those that are highly electrically conductive and contain a high content of lithium or an alloy of lithium or of another electroactive anode metal or metal alloy, an anode current collector layer may not be required. In these cases, the steps of coating the anode current collector layer and coating the second anode layer may be eliminated, and the first anode layer may be coated directly on the porous separator layer. This coating of the first anode layer may be a vapor deposition of the lithium or other metal composition of the anode layer or may be a coating or deposition by any of the other methods known in the art of metal anode layers for lithium batteries. Examples of lithium batteries that may not require an anode current collector layer and a second anode layer in the separator/anode assembly include lithium-sulfur batteries where the anode is typically a layer of lithium metal. If additional battery layers need to be coated on one or both sides of the lithium or other metal anode layer for battery stabilization during cycling and for other reasons, these additional layers may be coated in additional coating steps directly on the separator layer or on the metal anode layer. In cases where there are additional coating steps to form non-anode active layers on the separator layer, the anode layer may be coated on these additional non-anode active layers Examples of suitable separator coating layers for the present invention include, but are not limited to, the separator coatings described in U.S. Pat. Nos. 6,153,337 and 6,306,545 to Carlson et al. and U.S. Pat. Nos. 6,488,721 and 6,497,780 to Carlson. These separator coatings may be coated from an aqueous mix or a solvent mix onto a variety of substrates, such as, for example, silicone-treated plastic and paper substrates, polyester film substrates, polyolefin-coated papers, and metal substrates, and, alternatively, porous substrates such as, for example, porous plastic films and porous non-woven polymer fiber substrates. The advantages of coating the separator onto a substrate for this invention include, but are not limited to, (a) that the other layers of the lithium battery may be coated or laminated overlying this separator coating layer and then subsequently the substrate may be removed by delaminating to provide a dry stack of battery layers, or, alternatively, the substrate may be porous and may be used without any delaminating step, (b) the coating process for the separator layer lends itself to making thinner separators than are typically available from an extrusion process for the separator, and (c) the coated separator layer may be nanoporous with pore diameters of less than 0.1 microns that are too small to allow any penetration of the particles of the electrode and other overlying coating layers into the separator layer. Even separator layers with pore diameters up to 0.2 microns have been found to prevent the penetration into the separator layer of any particles of carbon black pigments as are typically used in lithium batteries.

The electrode coating layer may be coated on the full surface of the separator layer, or in lanes or strips on the separator layer, or in patches or rectangle shapes on the separator layer, depending on the requirements of the end use and the specific approach to doing the current collection from the layers of each electrode without having a short circuit due to contacting any layers of the electrode and current collector of opposite polarity. Cathode coating layers typically are coated from a pigment dispersion comprising an organic solvent, such as N-methyl pyrrolidone (NMP), and contain the electroactive or cathode active material in a pigment or particle form, a conductive carbon pigment, and an organic polymer. Anode coating layers typically are coated from a pigment dispersion comprising an organic solvent or water, and contain the electroactive or anode active material in a pigment or particle form, a conductive carbon pigment, and an organic polymer. These electrode pigments are particles with diameters typically greater than 0.1 microns and often in the range of 0.5 to 5 microns.

However, both the cathode and anode layers may be coated in a separator/electrode assembly and those assemblies combined to form a dry separator/electrode cell. In this case, the separator layer may be present on all of the electrode layers to give a "double separator" layer between the cathode and anode layers or, alternatively, may be present on only one electrode side of the separator/electrode assembly.

In one embodiment of the separator/anode assemblies of this invention, the anode current collector layer comprises a copper layer. In one embodiment, the thickness of the copper layer is less than 3 microns.

For the current collector layer, alternatively, a conductive non-metallic layer, such as a carbon pigment coating, as known in the art of lithium batteries, may be coated before and/or after the deposition of the metal current collector layer in order to achieve improved current collection and battery efficiency, as well as providing some added mechanical strength and flexibility. The metal current collector layer may be much thinner than the typically 10 to 12 micron thick metal substrates used in lithium batteries. For example, the metal current collector layer may have a thickness of less than 3 microns, and may be as thin as about 1 micron, such as in the range of 0.5 to 1.5 microns thick. This allows a higher proportion of electroactive material into the lithium battery, thereby enhancing the energy and power densities of the lithium battery. The metal current collector layer may be deposited by any of the metal deposition methods known in the art, such as by vacuum deposition in the case of copper layers.

In one embodiment of the separator/anode assemblies of this invention, the current collector layer is coated directly on the first anode layer on the side opposite to the separator layer. In one embodiment, the current collector layer comprises an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the anode current collector layer. In one embodiment, the anode current collector layer comprises a copper layer. In one embodiment, the thickness of the copper layer is less than 3 microns. In one embodiment, the electrically conductive material comprises copper. In one embodiment, the anode current collector layer comprises two or more layers coated directly on the first anode layer and wherein at least one of the two or more current collector layers comprises an electrically conductive material comprising carbon.

In one embodiment of the separator/anode assemblies of this invention, the thickness of the current collector layer is less than 3 microns. In one embodiment, the thickness of the current collector layer is from 0.5 to 1.5 microns. In one embodiment, the second anode layer is coated directly on the current collector layer on the side opposite to the first anode layer.

Another aspect of the present invention pertains to a battery comprising a separator/anode assembly, wherein the assembly comprises an anode current collector layer interposed between a first anode layer and a second anode layer and a porous separator layer on the side of the first anode layer opposite to the current collector layer, wherein the first anode layer is coated directly on the separator layer. In one embodiment, the battery is a lithium battery.

Another aspect of the present invention pertains to methods of making a separator/anode assembly for use in an electric current producing cell comprising the steps of (a) providing a porous separator layer; (b) coating a first anode layer directly on the separator layer; and (c) coating one or more anode current collector layers directly on the first anode layer to make the separator/anode assembly. In one embodiment, after step (c), there is a further step (d) of coating a second anode layer directly on the one or more anode current collector layers. In one embodiment, step (a) comprises coating a porous separator layer on a substrate. In one embodiment, the substrate is a release substrate, and, after step (c), there is a further step (d) of delaminating the substrate from the separator layer to form the separator/anode assembly. In one embodiment, after step (c) and prior to step (d), there is a further step of coating a second anode layer directly on the one or more anode current collector layers. In one embodiment, the substrate is a porous substrate. In one embodiment, the porous substrate is selected from the group consisting of porous polymer films and porous non-woven polymer fiber substrates.

Examples of a porous substrate include, but are not limited to, porous polyethylene films and porous polypropylene films such as, for example, are sold under the trade name of CELGARD by Polypore, Inc., Charlotte, N.C. In order to minimize the overall thickness of the separator layer, the porous substrate may be 5 to 12 microns in thickness and the porous separator layer coated on the porous substrate may be 2 to 10 microns in thickness. If the porous substrate has sufficient mechanical strength to be handled on the coating equipment as a free standing film or by the use of a temporary release liner and has the properties needed for a lithium battery separator, the use of a porous substrate in step (a) eliminates the need for a later delamination step because the porous substrate becomes a layer of the battery and functions as a separator. The porous separator layer coated directly on the porous substrate has the benefits of providing a layer of very small pores that prevents the penetration of any of the particles of the electrode layer directly coated on it and, if a heat resistant separator layer comprising aluminum boehmite or another non-melting material is used, has the added benefits of providing a safer and more heat resistant separator with dimensional stability at and above 200° C.

In one embodiment of the methods of preparing separator/anode assemblies of this invention, the one or more anode current collector layers of step (c) comprise a metal layer and the thickness of the metal layer is less than 3 microns. In one embodiment, the separator layer comprises pores having an average pore diameter of less than 0.2 microns, and preferably less than 0.1 microns. In one embodiment, the separator layer has a thickness of less than 9 microns, and preferably less than 6 microns.

FIG. 1 shows an example of a cross-section view (not to scale) of one version of a separator/anode assembly 30 of this invention after steps (a), (b), and (c). Separator/anode assembly 30 comprises a porous separator layer 38, a first anode layer 36, and an anode current collector layer 34. FIG. 2 shows an example of a cross-section view (not to scale) of another version of a separator/anode assembly 40 of the present invention after steps (a), (b), (c), and (d) of coating a second anode layer. Separator/anode assembly 40 comprises a porous separator layer 48, a first anode layer 46, an anode current collector layer 44, and a second anode layer 47.

In one embodiment of the methods of preparing separator/anode assemblies of this invention, the one or more anode current collector layers of step (c) comprise a metal layer and the thickness of the metal layer is less than 3 microns, and preferably is about 1 micron, such as in the range of 0.5 to 1.5 microns. In one embodiment, the separator comprises pores having an average pore diameter of less than 0.2 microns, and preferably less than 0.1 microns. In one embodiment, the separator has a thickness of less than 9 microns, and preferably less than 6 microns.

What is claimed is:

1. A method of making a separator/anode assembly for use in an electric current producing cell comprising the steps of:
    (a) providing a porous separator layer;
    (b) coating a first anode layer directly on said porous separator layer; and
    (c) coating one or more anode current collector layers directly on said first anode layer to make said separator/anode assembly.

2. The method of claim 1, wherein, after step (c), there is a further step (d) of coating a second anode layer directly on said one or more anode current collector layers.

3. The method of claim 1, wherein step (a) comprises coating a porous separator layer on a substrate.

4. The method of claim 3, wherein said substrate is a porous substrate.

5. The method of claim 4, wherein said porous substrate is selected from the group consisting of porous polymer films and porous non-woven polymer fiber substrates.

6. The method of claim 4, wherein, after step (c), there is a further step of coating a second anode layer directly on said one or more anode current collector layers.

7. The method of claim 1, wherein there are no pores larger than 0.2 microns in diameter in said porous separator layer of step (a).

8. The method of claim 1, wherein there are no pores larger than 0.1 microns in diameter in said porous separator layer of step (a).

9. The method of claim 1, wherein said one or more anode current collector layers of step (c) comprises a metal layer.

10. The method of claim 9, wherein the thickness of said metal layer is less than 3 microns.

11. The method of claim 1, wherein said porous separator layer has a thickness of less than 9 microns.

12. The method of claim 1, wherein said porous separator layer has dimensional stability at 200° C.

13. The method of claim 1, wherein coating the first anode layer comprises applying a pigment dispersion on the porous separator layer.

14. The method of claim 1, wherein the pigment dispersion comprises electrode particles having a diameter between 0.5 to 5 microns.

15. The method of claim 1, wherein the pigment dispersion comprises an organic solvent or water.

16. The method of claim 1, further comprising joining the separator/anode assembly with a separator/cathode assembly to produce the electric current producing cell.

17. The method of claim 1, wherein the separator layer comprises inorganic oxide particles.

18. The method of claim 17, wherein the inorganic oxide particles comprise aluminum boehmite.

19. The method of claim 1, wherein said separator layer comprises separator particles and said separator particles are selected from the group consisting of inorganic oxide particles, inorganic nitride particles, inorganic carbonate particles, inorganic sulfate particles, and polymer particles.

20. A method of making a separator/anode assembly for use in an electric current producing cell comprising the steps of:
    (a) providing a porous separator layer; and
    (b) depositing an anode layer directly on said porous separator layer, wherein said anode layer comprises lithium metal.

* * * * *